(12) United States Patent
Eastep et al.

(10) Patent No.: US 11,851,561 B2
(45) Date of Patent: Dec. 26, 2023

(54) FIBER-REINFORCED POLYMER COMPOSITION

(71) Applicant: Ticona LLC, Florence, KY (US)

(72) Inventors: David W. Eastep, Winona, WI (US); Kent Moore, LaCrosse, WI (US)

(73) Assignee: Ticona LLC, Florence, KY (US)

(*) Notice: Subject to any disclaimer, the term of this patent is extended or adjusted under 35 U.S.C. 154(b) by 254 days.

(21) Appl. No.: 17/346,355

(22) Filed: Jun. 14, 2021

(65) Prior Publication Data

US 2021/0403708 A1 Dec. 30, 2021

Related U.S. Application Data

(60) Provisional application No. 63/043,884, filed on Jun. 25, 2020.

(51) Int. Cl.
| | |
|---|---|
| *C08L 69/00* | (2006.01) |
| *C08L 67/03* | (2006.01) |
| *C08J 3/20* | (2006.01) |
| *C08J 5/04* | (2006.01) |
| *C08K 7/06* | (2006.01) |
| *C08K 3/04* | (2006.01) |
| *C08K 7/14* | (2006.01) |

(52) U.S. Cl.
CPC ........... *C08L 69/00* (2013.01); *C08J 3/203* (2013.01); *C08J 5/042* (2013.01); *C08J 5/043* (2013.01); *C08K 3/04* (2013.01); *C08K 7/06* (2013.01); *C08K 7/14* (2013.01); *C08L 67/03* (2013.01); *C08J 2367/03* (2013.01); *C08J 2369/00* (2013.01); *C08J 2467/03* (2013.01); *C08J 2469/00* (2013.01)

(58) Field of Classification Search
CPC .......... C08L 69/00; C08L 67/02; C08K 7/06; C08K 7/14; C08K 3/04; C08G 63/183
USPC ....................................................... 523/206
See application file for complete search history.

(56) References Cited

U.S. PATENT DOCUMENTS

| | | |
|---|---|---|
| 3,563,847 A | 2/1971 | Rye et al. |
| 4,113,692 A | 9/1978 | Wambach |
| RE32,772 E | 10/1988 | Hawley |
| 4,997,875 A | 3/1991 | Geddes et al. |
| 5,326,793 A | 7/1994 | Gallucci et al. |
| 7,687,583 B2 | 3/2010 | Chakravarti et al. |
| 7,858,172 B2 | 12/2010 | Imaizumi et al. |
| 8,657,581 B2 | 2/2014 | Pilpel et al. |
| 8,859,089 B2 | 10/2014 | Nelson et al. |
| 8,921,692 B2 | 12/2014 | Nelson et al. |
| 9,062,183 B2 | 6/2015 | Markgraf et al. |
| 9,096,000 B2 | 8/2015 | Maliszewski et al. |
| 9,190,184 B2 | 11/2015 | Nelson et al. |
| 9,238,347 B2 | 1/2016 | Nelson et al. |
| 9,278,475 B1 | 3/2016 | Khami et al. |
| 9,409,347 B2 | 8/2016 | Nelson et al. |
| 9,659,680 B2 | 5/2017 | Nelson et al. |
| 9,919,481 B2 | 3/2018 | Nelson et al. |
| 10,253,752 B2 | 4/2019 | Caruso et al. |
| 10,676,845 B2 | 6/2020 | Nelson et al. |
| 11,124,678 B2 | 9/2021 | Chopin |
| 2009/0004460 A1* | 1/2009 | Gruber ..................... C08K 7/24 428/323 |
| 2010/0009158 A1* | 1/2010 | Imaizumi ................. B29B 9/14 428/297.4 |
| 2013/0323289 A1* | 12/2013 | Hirota ..................... C23C 14/20 424/630 |
| 2015/0084228 A1 | 3/2015 | Nelson et al. |
| 2015/0218337 A1* | 8/2015 | Studart ................... B32B 27/30 428/220 |
| 2015/0298400 A1 | 10/2015 | Maliszewski et al. |
| 2016/0200081 A1* | 7/2016 | Habraken ................. C08J 5/10 428/474.7 |
| 2017/0058862 A1* | 3/2017 | Caruso ............. B29C 66/72141 |
| 2017/0298214 A1* | 10/2017 | Moniruzzaman ...... C08K 5/103 |
| 2018/0291145 A1* | 10/2018 | Monden ................. C08K 5/524 |
| 2019/0270260 A1 | 9/2019 | Johnson et al. |
| 2019/0329491 A1* | 10/2019 | Yu .......................... B29C 64/165 |
| 2022/0185995 A1* | 6/2022 | Eastep .................... C08J 5/043 |
| 2022/0186005 A1* | 6/2022 | Johnson ................. C08L 23/12 |
| 2022/0195161 A1* | 6/2022 | Eastep .................... C08L 23/12 |
| 2022/0200124 A1* | 6/2022 | Eastep ................... H01Q 21/28 |

OTHER PUBLICATIONS

International Search Report and Written Opinion for PCT/US2021/037374 dated Sep. 29, 2021, 12 pages.

* cited by examiner

*Primary Examiner* — Hannah J Pak
(74) *Attorney, Agent, or Firm* — Dority & Manning, P.A.

(57) ABSTRACT

A fiber-reinforced polymer composition a plurality of continuous fibers embedded and distributed within a thermoplastic polymer matrix is provided. The thermoplastic polymer matrix constitutes from about 20 wt. % to about 90 wt. % of the composition and the continuous fibers constitute from about 10 wt. % to about 80 wt. % of the composition. Further, the polymer composition has a deflection temperature under load of about 60° C. or more as determined in accordance with ISO 75:2013 at a load of 3.5 MPa.

23 Claims, 3 Drawing Sheets

FIBER-REINFORCED POLYMER COMPOSITION

CROSS REFERENCE TO RELATED APPLICATION

The present application claims filing benefit of U.S. Provisional Patent Application Ser. No. 63/043,884 having a filing date of Jun. 25, 2020, which is incorporated herein by reference in its entirety.

BACKGROUND OF THE INVENTION

Fiber-reinforced composites have been employed in a wide variety of applications as lightweight structural reinforcements. For example, blades (e.g., wind turbine blades, helicopter blades, fan blades, aircraft propellers, wings, boat propellers, etc.) are often structurally reinforced with a fiber-reinforced composite. For example, most rotor blades employ a composite laminate shell that overlies an internal structure (e.g., blade spar) extending along a length of the rotor blade toward a tip thereof. The shell of the rotor blade is generally built around the internal structure of the blade by stacking layers of fiber composites in a mold. A significant problem with conventional composites, however, is that they often rely upon thermoset resins (e.g., epoxy resins or vinyl esters) to help achieve the desired strength properties. Thermoset resins are difficult to use during manufacturing and do not possess good bonding characteristics for forming layers with other materials. Attempts have been made to form composites from thermoplastic polymers. U.S. Pat. No. 8,657,581 to Pilpel, et al., for instance, describes attempts to use thermoplastic resins in the composite of a rotor blade. Unfortunately, such composites often exhibit flaws and dry spots due to inadequate wetting of the fibers, which can result in poor mechanical properties. Another problem with such cores is that the thermoplastic resins do not have adequate performance at high temperatures. As such, a need exists for a fiber-reinforced polymer composition that has improved properties (e.g., mechanical properties and heat resistance) for use in various parts, such as blades.

SUMMARY OF THE INVENTION

In accordance with one embodiment of the present invention, a fiber-reinforced polymer composition is disclosed that comprises a plurality of continuous fibers embedded and distributed within a thermoplastic polymer matrix. The thermoplastic polymer matrix constitutes from about 20 wt. % to about 90 wt. % of the composition and the continuous fibers constitute from about 10 wt. % to about 80 wt. % of the composition. Further, the polymer composition has a deflection temperature under load of about 60° C. or more as determined in accordance with ISO 75:2013 at a load of 3.5 MPa.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
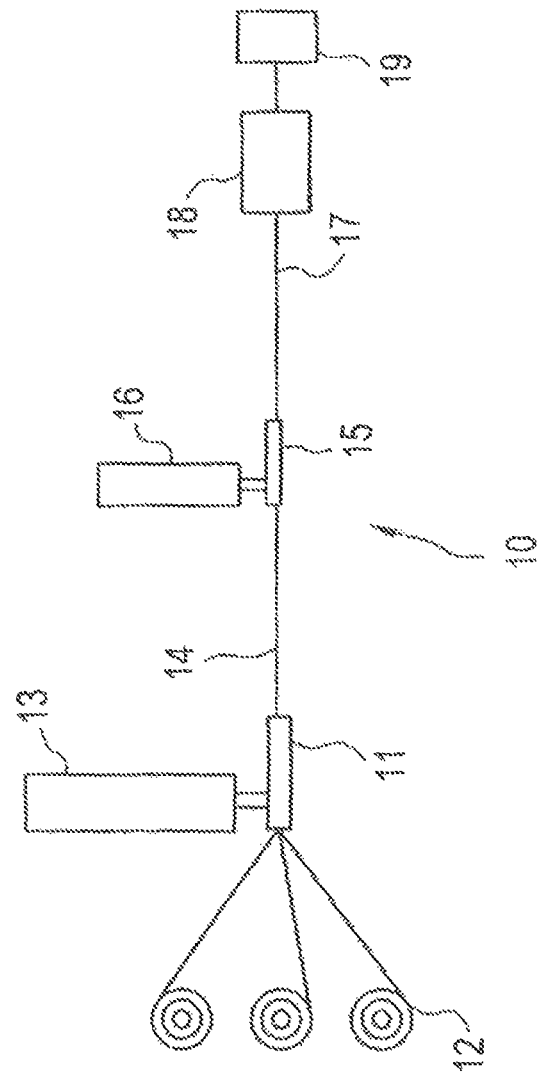
FIG. 1 is a schematic illustration of one embodiment of a system that may be used to form the fiber-reinforced polymer composition of the present invention.

It is to be understood by one of ordinary skill in the art that the present discussion is a description of exemplary embodiments only, and is not intended as limiting the broader aspects of the present invention.

Generally speaking, the present invention is directed to a polymer composition (e.g., tape, sheet, etc.) that contains a plurality of continuous fibers distributed within a thermoplastic polymer matrix. By selectively controlling the specific nature and concentration of the continuous fibers and polymers within the matrix, as well as the manner in which they are combined, the present inventors have discovered that the resulting composition can achieve certain unique properties that enable the composition to be readily employed in various applications, such as in rotor blades. More particularly, the polymer composition has a high degree of heat resistance, such as reflected by a deflection temperature under load ("DTUL") of about 60° C. or more, in some embodiments about 65° C. or more, in some embodiments about 70° C. or more, in some embodiments from about 75° C. to about 250° C., and in some embodiments, from about 80° C. to about 200° C., as determined in accordance with ISO 75:2013 at a load of 3.5 MPa. Despite containing such a high degree of heat resistance, the present inventors have also discovered that the resulting composition can still retain a high degree of mechanical strength and flexibility. For example, the composition may exhibit a tensile strength of from about 400 to about 3,000 MPa, in some embodiments from about 600 to about 1,500 MPa, and in some embodiments, from about 700 to about 1,000 MPa; a tensile break strain of about 0.5% or more, in some embodiments from about 0.6% to about 5%, and in some embodiments, from about 0.7% to about 3%; and/or a tensile modulus of from about 10,000 MPa to about 60,000 MPa, in some embodiments from about 25,000 MPa to about 50,000 MPa, and in some embodiments, from about 30,000 MPa to about 40,000 MPa. The tensile properties may be determined in accordance with ASTM D3039-17 at −30° C., 23° C., or 80° C. The composition may also exhibit a flexural strength of from about 200 to about 2,000 MPa, in some embodiments from about 400 to about 1,000 MPa, and in some embodiments, from about 500 to about 900 MPa and/or a flexural modulus of from about 10,000 MPa to about 60,000 MPa, in some embodiments from about 25,000 MPa to about 50,000 MPa, and in some embodiments, from about 30,000 MPa to about 40,000 MPa. The flexural properties may be determined in accordance with ISO Test No. 178:2010 at −30° C., 23° C., or 80° C.

Various embodiments of the present invention will now be described in more detail.

I. Fiber-Reinforced Composition

A. Polymer Matrix

The polymer matrix typically constitutes from about 20 wt. % to about 90 wt. %, in some embodiments from about 35 wt. % to about 85 wt. %, and in some embodiments, from about 50 wt. % to about 80 wt. % of the composition. The polymer matrix generally functions as a continuous phase of the polymer composition and contains one or more thermoplastic polymers, such as thermoplastic aromatic polymers. In one embodiment, for instance, the polymer matrix may contain an aromatic polyester, which may be a condensation product of at least one diol (e.g., aliphatic and/or cycloaliphatic) with at least one aromatic dicarboxylic acid, such as those having from 4 to 20 carbon atoms, and in some embodiments, from 8 to 14 carbon atoms. Suitable diols may include, for instance, neopentyl glycol, cyclohexanedimethanol, 2,2-dimethyl-1,3-propane diol and aliphatic glycols of the formula $HO(CH_2)_nOH$ where n is an integer of 2 to 10. Suitable aromatic dicarboxylic acids may include, for instance, isophthalic acid, terephthalic acid, 1,2-di(p-carboxyphenyl)ethane, 4,4'-dicarboxydiphenyl ether, etc., as well as combinations thereof. Fused rings can also be present such as in 1,4- or 1,5- or 2,6-naphthalene-dicarboxylic acids. Particular examples of such aromatic polyesters may include, for instance, poly(ethylene terephthalate) (PET), poly(1,4-butylene terephthalate) (PBT), poly(1,3-propylene terephthalate) (PPT), poly(1,4-butylene 2,6-naphthalate) (PBN), poly(ethylene 2,6-naphthalate) (PEN), poly(1,4-cyclohexylene dimethylene terephthalate) (PCT), as well as mixtures of the foregoing.

Derivatives and/or copolymers of aromatic polyesters (e.g., polyethylene terephthalate) may also be employed. For instance, in one embodiment, a modifying acid and/or diol may be used to form a derivative of such polymers. As used herein, the terms "modifying acid" and "modifying diol" are meant to define compounds that can form part of the acid and diol repeat units of a polyester, respectively, and which can modify a polyester to reduce its crystallinity or render the polyester amorphous. Examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, etc. In practice, it is often preferable to use a functional acid derivative thereof such as the dimethyl, diethyl, or dipropyl ester of the dicarboxylic acid. The anhydrides or acid halides of these acids also may be employed where practical. Examples of modifying diol components may include, but are not limited to, neopentyl glycol, 1,4-cyclohexanedimethanol, 1,2-propanediol, 1,3-propanediol, 2-methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl 1,3-cyclobutane diol, Z,8-bis(hydroxymethyltricyclo-[5.2.1.0]-decane wherein Z represents 3, 4, or 5; 1,4-bis(2-hydroxyethoxy)benzene, 4,4'-bis(2-hydroxyethoxy) diphenylether [bis-hydroxyethyl bisphenol A], 4,4'-Bis(2-hydroxyethoxy)diphenylsulfide [bis-hydroxyethyl bisphenol S] and diols containing one or more oxygen atoms in the chain, e.g., diethylene glycol, triethylene glycol, dipropylene glycol, tripropylene glycol, etc. In general, these diols contain 2 to 18, and in some embodiments, 2 to 8 carbon atoms. Cycloaliphatic diols can be employed in their cis- or trans-configuration or as mixtures of both forms.

Aromatic polyesters, such as described above, typically have an intrinsic viscosity of from about 0.1 dl/g to about 6 dl/g, in some embodiments from about 0.2 to about 5 dl/g, and in some embodiments from about 0.3 to about 1 dl/g, such as determined in accordance with ISO 1628-5:1998. The aromatic polyesters likewise typically have a glass transition temperature of from about 30° C. to about 120° C., in some embodiments from about 40° C. to about 110° C., and in some embodiments, from about 50° C. to about 100° C., such as determined by ISO 11357-2:2013, as well as a Vicat softening temperature of from about 40° C. to about 150° C., in some embodiments from about 50° C. to about 130° C., and in some embodiments, from about 60° C. to about 110° C., such as determined in accordance with ISO 306:2004. Due to their relatively low glass transition temperature and Vicat softening temperature, the aromatic polyesters are particularly well suited to be used in fiber-reinforced polymer compositions. Namely, the aromatic polyesters can more readily "wet out" the fibers so that an integrated physical structure is formed having consistent thermal and mechanical performance.

In certain cases, the aromatic polyesters employed may have a relatively low degree of heat resistance, such as a DTUL value of from about 20° C. to about 80° C., in some embodiments from about 30° C. to about 70° C., and in some embodiments, from about 40° C. to about 65° C., as determined in accordance with ISO 75-2:2013 at a load of 1.8 MPa. In such embodiments, it may be desired to employ one or more additional polymers that have a higher degree of heat resistance. In one embodiment, for instance, the polymer matrix may contain a blend of at least one aromatic polyester and at least one additional polymer to help achieve the desired degree of heat resistance. When employed, aromatic polyester(s) typically constitute from about 40 wt. % to about 99 wt. %, in some embodiments from about 50 wt. % to at about 95 wt. %, in some embodiments from about 60 wt. % to about 92 wt. %, and in some embodiments, from about 65 wt. % to about 90 wt. % of the polymer matrix, while additional polymer(s) typically constitute from about 1 wt. % to about 60 wt. %, in some embodiments from about 5 wt. % to about 50 wt. %, in some embodiments from about 8 wt. % to about 40 wt. %, and in some embodiments, from about 10 wt. % to about 35 wt. % of the polymer matrix.

When employed, the additional polymer(s) typically have a relatively high degree of heat resistance, such as a DTUL value of from about 80° C. to about 300° C., in some embodiments from about 100° C. to about 250° C., and in some embodiments, from about 140° C. to about 220° C., as determined in accordance with ISO 75-2:2013 at a load of 1.8 MPa. However, to help minimize any adverse impact such polymers might have on the ability of the polymer matrix to adequately wet out the continuous fibers, the additional polymer(s) are also selected to have a relatively high melt volume flow rate. For example, the additional polymer(s) may have a melt volume flow rate ("MVR") of about 2 cubic centimeters per 10 minutes ("cm³/10 min") or more, in some embodiments from about 5 to about 50 cm³/10 min, and in some embodiments, from about 10 to about 30 cm³/10 min, as determined at a temperature of 250° C. and load of 2.16 kg in accordance with ISO 1133:2011.

One particularly suitable example of an additional polymer having the characteristics noted above is an aromatic polycarbonate, which typically contains repeating structural carbonate units of the formula $-R^1-O-C(O)-O-$. The polycarbonate is aromatic in that at least a portion (e.g., 60% or more) of the total number of $R^1$ groups contain aromatic moieties and the balance thereof are aliphatic, alicyclic, or aromatic. In one embodiment, for instance, $R^1$ may a $C_{6-30}$ aromatic group, that is, contains at least one aromatic moiety. Typically, $R^1$ is derived from a dihydroxy aromatic compound of the general formula HO—$R^1$—OH, such as those having the specific formula referenced below:

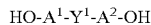

wherein,
$A^1$ and $A^2$ are independently a monocyclic divalent aromatic group; and
$Y^1$ is a single bond or a bridging group having one or more atoms that separate $A^1$ from $A^2$. In one particular embodiment, the dihydroxy aromatic compound may be derived from the following formula (I):

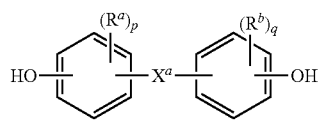

wherein,
$R^a$ and $R^b$ are each independently a halogen or $C_{1-12}$ alkyl group, such as a $C_{1-3}$ alkyl group (e.g., methyl) disposed meta to the hydroxy group on each arylene group;
p and q are each independently 0 to 4 (e.g., 1); and
$X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group.

In one embodiment, $X^a$ may be a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalcyl, $C_{7-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of the following formula (II):

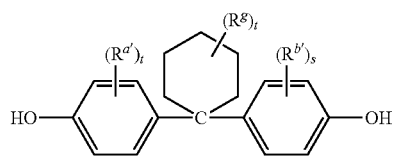

wherein,
$R^{a'}$ and $R^{b'}$ are each independently $C_{1-12}$ alkyl (e.g., $C_{1-4}$ alkyl, such as methyl), and may optionally be disposed meta to the cyclohexylidene bridging group;
$R^g$ is $C_{1-12}$ alkyl (e.g., $C_{1-4}$ alkyl) or halogen;
r and s are each independently 1 to 4 (e.g., 1); and
t is 0 to 10, such as 0 to 5.

The cyclohexylidene-bridged bisphenol can be the reaction product of two moles of o-cresol with one mole of cyclohexanone. In another embodiment, the cyclohexylidene-bridged bisphenol can be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ may be a $C_{1-18}$ alkylene group, a $C_{3-18}$ cycloalkylene group, a fused $C_{6-18}$ cycloalkylene group, or a group of the formula —$B^1$—W—$B^2$—, wherein $B^1$ and $B^2$ are independently a $C_{1-6}$ alkylene group and W is a $C_{3-12}$ cycloalkylidene group or a $C_{6-16}$ arylene group.

$X^a$ may also be a substituted $C_{3-18}$ cycloalkylidene of the following formula (III):

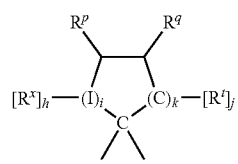

wherein,
$R^r$, $R^p$, $R^q$, and $R^t$ are each independently hydrogen, halogen, oxygen, or $C_{1-12}$ organic groups;
I is a direct bond, a carbon, or a divalent oxygen, sulfur, or —N(Z)—, wherein Z is hydrogen, halogen, hydroxy, $C_{1-12}$ alkyl, $C_{1-12}$ alkoxy, or $C_{1-12}$ acyl;
h is 0 to 2;
j is 1 or 2;
i is 0 or 1; and
k is 0 to 3, with the proviso that at least two of $R^r$, $R^p$, $R^q$, and $R^t$ taken together are a fused cycloaliphatic, aromatic, or heteroaromatic ring.

Other useful aromatic dihydroxy aromatic compounds include those having the following formula (IV):

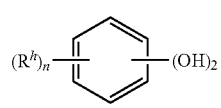

wherein,
$R^h$ is independently a halogen atom (e.g., bromine), $C_{1-10}$ hydrocarbyl (e.g., $C_{1-10}$ alkyl group), a halogen-substituted $C_{1-10}$ alkyl group, a $C_{6-10}$ aryl group, or a halogen-substituted $C_{6-10}$ aryl group;
n is 0 to 4.

Specific examples of bisphenol compounds of formula (I) include, for instance, 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). In one specific embodiment, the polycarbonate may be a linear homopolymer derived from bisphenol A, in which each of $A^1$ and $A^2$ is p-phenylene and $Y^1$ is isopropylidene in formula (I).

Other examples of suitable aromatic dihydroxy compounds may include, but not limited to, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, etc., as well as combinations thereof.

Aromatic polycarbonates, such as described above, typically have an intrinsic viscosity of from about 0.1 dl/g to about 6 dl/g, in some embodiments from about 0.2 to about 5 dl/g, and in some embodiments from about 0.3 to about 1 dl/g, such as determined in accordance with ISO 1628-4:1998. The aromatic polycarbonates likewise typically have a glass transition temperature and Vicat softening temperature greater than the aromatic polyesters present within the polymer matrix. For example, the aromatic polycarbonates may have a glass transition temperature of from about 50° C. to about 250° C., in some embodiments from about 90° C. to about 220° C., and in some embodiments, from about 100° C. to about 200° C., such as determined by ISO 11357-2:2013, as well as a Vicat softening temperature of from about 50° C. to about 250° C., in some embodiments from about 90° C. to about 220° C., and in some embodiments, from about 100° C. to about 200° C., such as determined in accordance with ISO 306:2004.

A wide variety of additional additives can also be included in the polymer matrix, such as coupling agents, flow modifiers, pigments, antioxidants, stabilizers (e.g., ultraviolet light stabilizer, light stabilizer, heat stabilizer, etc.), fillers, antistatic agents, surfactants, waxes, flame retardants, additional polymers, and other materials added to enhance properties and processability. In certain embodiments, for example, the composition may contain a UV stabilizer. Suitable UV stabilizers may include, for instance, benzophenones (e.g., (2-hydroxy-4-(octyloxy)phenyl)phenyl, methanone (Chimassorb® 81), benzotriazoles (e.g., 2-(2-hydroxy-3,5-di-α-cumylphenyl)-2H-benzotriazole (Tinuvin® 234), 2-(2-hydroxy-5-tert-octylphenyl)-2H-benzotriazole (Tinuvin® 329), 2-(2-hydroxy-3-α-cumyl-5-tert-octylphenyl)-2H-benzotriazole (Tinuvin® 928), etc.), triazines (e.g., 2,4-diphenyl-6-(2-hydroxy-4-hexyloxyphenyl)-s-triazine (Tinuvin® 1577)), sterically hindered amines (e.g., bis(2,2,6,6-tetramethyl-4-piperidyl)sebacate (Tinuvin® 770) or a polymer of dimethyl succinate and 1-(2-hydroxyethyl)-4-hydroxy-2,2,6,6-tetramethyl-4-piperidine (Tinuvin® 622)), and so forth, as well as mixtures thereof. When employed, such UV stabilizers typically constitute from about 0.05 wt. % to about 10 wt. % in some embodiments from about 0.1 wt. % to about 8 wt. %, and in some embodiments, from about 0.25 wt. % to about 6 wt. % of the polymer matrix. The polymer matrix may also contain a pigment, such as titanium dioxide, ultramarine blue, cobalt blue, phthalocyanines, anthraquinones, carbon black, gray pigment, metallic pigment etc., as well as mixtures thereof. Such pigments typically constitute from about 0.01 to about 15 wt. %, and in some embodiments, from about 0.5 wt. % to about 10 wt. % of the polymer matrix.

If desired, a coupling agent may likewise be employed to enhance the degree of adhesion between the continuous fibers with the polymer matrix. When employed, such coupling agent typically constitute from about 0.1 wt. % to about 15 wt. %, in some embodiments from about 0.2 wt. % to about 10 wt. %, and in some embodiments, from about 0.5 wt. % to about 5 wt. % of the polymer matrix. In certain embodiments, the coupling agent may be a polyolefin coupling agent that contains a polyolefin that is modified with a polar functional group. The polyolefin may be an olefin homopolymer (e.g., polypropylene) or copolymer (e.g., ethylene copolymer, propylene copolymer, etc.). The functional group may be grafted onto the polyolefin backbone or incorporated as a monomeric constituent of the polymer (e.g., block or random copolymers), etc. Particularly suitable functional groups include (meth)acrylic acid (e.g., acrylic acid, methacrylic acid, etc.), maleic anhydride, maleic acid, fumaric acid, maleimide, maleic acid hydrazide, a reaction product of maleic anhydride and diamine, dichloromaleic anhydride, maleic acid amide, etc. If desired, the coupling agent may also be "epoxy-functionalized" polymer in that it contains an epoxy functional group. One example of such a functional group is an epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Regardless of the particular components employed, the raw materials (e.g., aromatic polyester, aromatic polycarbonate, etc.) are typically melt blended together prior to being reinforced with the continuous fibers. The raw materials may be supplied either simultaneously or in sequence to a melt-blending device that dispersively blends the materials. Batch and/or continuous melt blending techniques may be employed. For example, a mixer/kneader, Banbury mixer, Farrel continuous mixer, single-screw extruder, twin-screw extruder, roll mill, etc., may be utilized to blend the materials. One particularly suitable melt-blending device is a co-rotating, twin-screw extruder (e.g., ZSK-30 twin-screw extruder available from Werner & Pfleiderer Corporation of Ramsey, N.J.). Such extruders may include feeding and venting ports and provide high intensity distributive and dispersive mixing. For example, the aromatic polyester and aromatic polycarbonate may be fed to a feeding port of the twin-screw extruder and melted. Thereafter, certain additives (e.g., pigments, stabilizers, etc.) may be injected into the polymer melt. Alternatively, the additives may be separately fed into the extruder at a different point along its length. Regardless of the particular melt blending technique chosen, the raw materials are blended under high shear/pressure and heat to ensure sufficient mixing. For example, melt blending may occur at a temperature of from about 150° C. to about 400° C., in some embodiments, from about 200° C. to about 375° C., and in some embodiments, from about 250° C. to about 350° C.

B. Continuous Fibers

To form the fiber-reinforced composition, continuous fibers are generally embedded within the polymer matrix. The term "continuous fibers" generally refers to fibers that have a length that is the same or substantially similar to the part into which it is formed. Such continuous fibers typically constitute from about 10 wt. % to about 80 wt. %, in some embodiments from about 15 wt. % to about 65 wt. %, and in some embodiments, from about 20 wt. % to about 50 wt. % of the composition.

The continuous fibers may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar®), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions. Glass fibers and carbon fibers are particularly desirable. Such fibers often have a nominal diameter of about 4 to about 35 micrometers, and in some embodiments, from about 9 to about 35 micrometers. The fibers may be twisted or straight. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain carbon fibers, while other rovings may contain glass fibers. The number of fibers contained in each roving can be constant or vary from roving to roving. Typically, a roving may contain from about 1,000 fibers to about 50,000 individual fibers, and in some embodiments, from about 2,000 to about 40,000 fibers.

Any of a variety of different techniques may generally be employed to incorporate the fibers into the polymer matrix. The fibers are generally distributed in an aligned fashion. For instance, continuous fibers may initially be impregnated into the polymer matrix to form an extrudate. In such embodiments, the polymer matrix and continuous fibers (e.g., rovings) are typically pultruded through an impregnation die to achieve the desired contact between the fibers and the polymer. Pultrusion can also help ensure that the fibers are spaced apart and oriented in a longitudinal direction that is parallel to a major axis of the pellet (e.g., length), which further enhances the mechanical properties. Referring to FIG. 1, for instance, one embodiment of a pultrusion process 10 is shown in which a polymer matrix is supplied from an extruder 13 to an impregnation die 11 while continuous fibers 12 are pulled through the die 11 via a puller device 18 to produce a composite structure 14. Typical puller devices may include, for example, caterpillar pullers and reciprocating pullers. While optional, the composite structure 14 may also be pulled through a coating die 15 that is attached to an extruder 16 through which a coating resin is applied to form a coated composite structure 17.

Regardless, the nature of the impregnation die employed during the pultrusion process may be selectively varied to help achieved good contact between the polymer matrix and the continuous fibers. Examples of suitable impregnation die systems are described in detail in Reissue Pat. No. 32,772 to Hawley; U.S. Pat. No. 9,233,486 to Regan, et al.; and U.S. Pat. No. 9,278,472 to Eastep, et al. Referring to FIG. 6, for instance, one embodiment of such a suitable impregnation die 11 is shown. As shown, a polymer matrix 214 may be supplied to the impregnation die 11 via an extruder (not shown) and optionally heated inside the die by a heater 133. The die is generally operated at temperatures that are sufficient to cause and/or maintain the proper softening temperature for the polymer, thus allowing for the desired level of impregnation of the rovings by the polymer. The polymer matrix 214 flows into the die 11 as indicated by resin flow direction 244. The polymer matrix 214 is distributed within the die 11 and then interacts with fibers 142 (e.g., fiber rovings), which are traversed through the die 11 in roving run direction 282 and coated with the polymer matrix 214.

The impregnation die 11 may also include a manifold assembly 220 and an impregnation section. Within the impregnation section, it is generally desired that the fibers 142 are traversed through an impregnation zone 250 to impregnate the rovings with the polymer matrix 214. The impregnation zone 250 may be defined between two spaced apart opposing impregnation plates 256 and 258. First plate 256 defines a first inner surface 257, while second plate 258 defines a second inner surface 259. The contact surfaces 252 may be defined on or extend from both the first and second inner surfaces 257 and 259, or only one of the first and second inner surfaces 257 and 259. Angle 254 at which the fibers 142 traverse the contact surfaces 252 may be generally high enough to enhance shear and pressure, but not so high to cause excessive forces that will break the fibers. Thus, for example, the angle 254 may be in the range between approximately 1° and approximately 30°, and in some embodiments, between approximately 5° and approximately 25°. Within the impregnation zone 250, the polymer matrix may be forced generally transversely through the rovings by shear and pressure created in the impregnation zone 250, which significantly enhances the degree of impregnation. Typically, the die 11 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the fibers 142. The impregnation section may also include one or more channels 222 through which the polymer matrix 214 can flow. After flowing through the manifold assembly 220, the polymer matrix 214 may flow through a gate passage 270 and the impregnated fibers 142 may exit through outlet region 242. If desired, a land zone 280 may be positioned downstream of the impregnation zone 250 in run direction 282 of the fibers 142. The fibers 142 may traverse through the land zone 280 before exiting the die 150. Further, a faceplate 290 may adjoin or be adjacent to the impregnation zone 250 to meter excess polymer 214 from the fibers 142. The faceplate 290 may be positioned downstream of the impregnation zone 250 and, if included, the land zone 280, in the run direction 282. The faceplate 290 may contact other components of the die 11, such as the impregnation zone 250 or land zone 280, or may be spaced therefrom.

Figure 2:
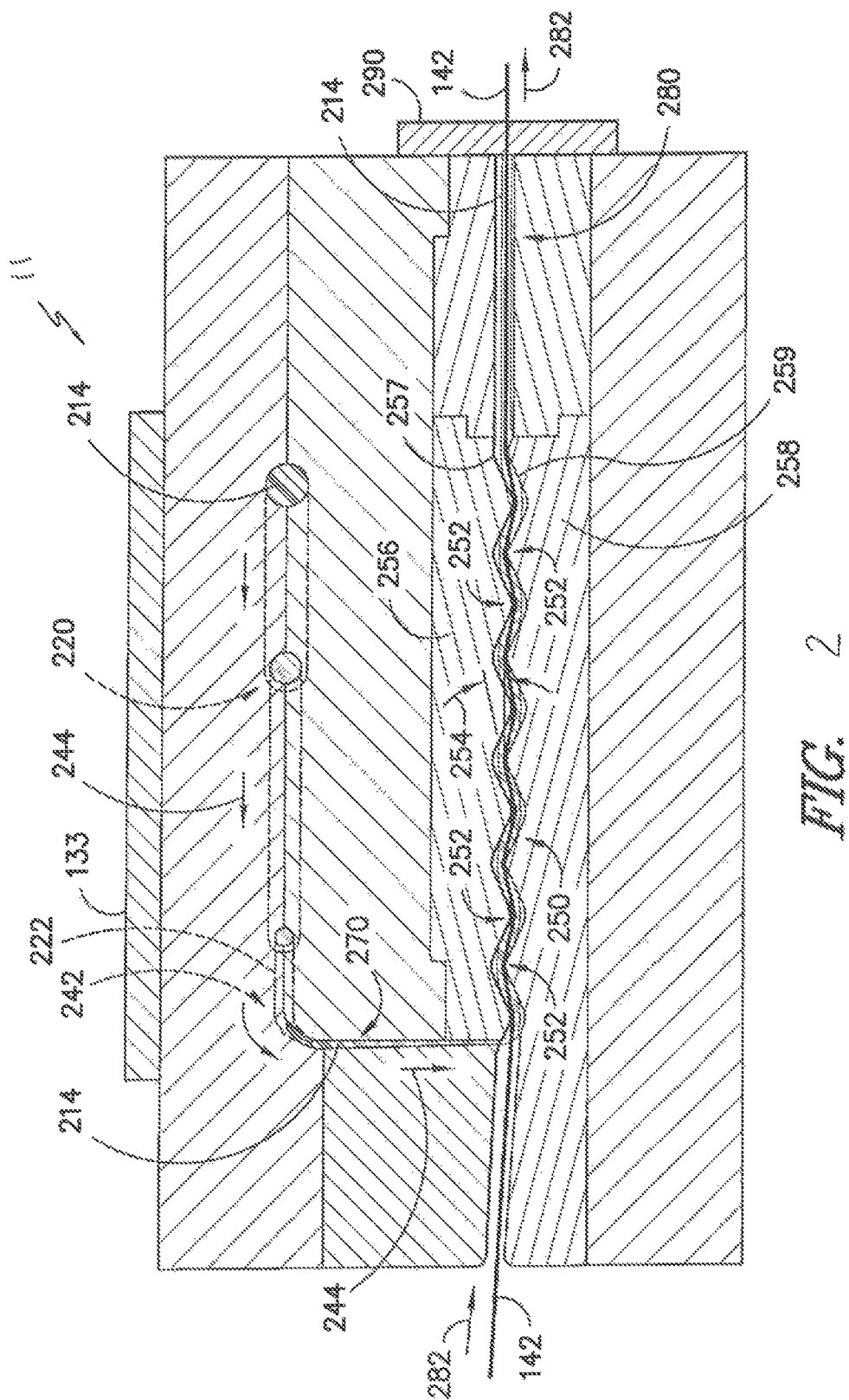
FIG. 2 is a cross-sectional view of an impregnation die that may be employed in the system shown in FIG. 1.

To further facilitate impregnation, the fibers may be kept under tension while present within the impregnation die. The tension may, for example, range from about 5 to about 300 Newtons, in some embodiments from about 50 to about 250 Newtons, and in some embodiments, from about 100 to about 200 Newtons per tow of fibers. Furthermore, the fibers may also pass impingement zones in a tortuous path to enhance shear. For example, in the embodiment shown in FIG. 2, the fibers traverse over the impingement zones in a sinusoidal-type pathway.

The impregnation die shown and described above is but one of various possible configurations that may be employed in the present invention. In alternative embodiments, for example, the fibers may be introduced into a crosshead die that is positioned at an angle relative to the direction of flow of the polymer melt. As the fibers move through the crosshead die and reach the point where the polymer exits from an extruder barrel, the polymer is forced into contact with the fibers. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a bundle or tow of individual fibers, which may each contain up to as many as 24,000 fibers, across the entire width of the merged tow. This helps achieve uniform distribution of strength properties in the composition. Such an assembly may include a supply of compressed air or another gas that impinges in a generally perpendicular fashion on the moving fiber tows that pass across the exit ports. The spread fiber bundles may then be introduced into a die for impregnation, such as described above.

The resulting fiber-reinforced polymer composition may exhibit a very low void fraction, which helps enhance strength. For instance, the void fraction may be about 5% or less, in some embodiments about 3% or less, in some embodiments about 2% or less, in some embodiments about 1.5% or less, in some embodiments about 1% or less, and in some embodiments, about 0.5% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-18 to determine the weights of the fibers and the polymer matrix, which may then be used to calculate the "void fraction" based on the following equations:

$$V_f = 100*(\rho_t - \rho_c)/\rho_t$$

where,
$V_f$ is the void fraction as a percentage;
$\rho_c$ is the density of the composite as measured using known techniques, such as with a liquid or gas pycnometer (e.g., helium pycnometer);
$\rho_t$ is the theoretical density of the composite as is determined by the following equation:

$$\rho_t = 1/[W_f/\rho_f + W_m/\rho_m]$$

$\rho_m$ is the density of the polymer matrix (e.g., at the appropriate crystallinity);
$\rho_f$ is the density of the fibers;
$W_f$ is the weight fraction of the fibers; and
$W_m$ is the weight fraction of the polymer matrix.

Alternatively, the void fraction may be determined by chemically dissolving the resin in accordance with ASTM D 3171-15. The "burn off" and "dissolution" methods are particularly suitable for glass fibers, which are generally resistant to melting and chemical dissolution. In other cases, however, the void fraction may be indirectly calculated based on the densities of the polymer, fibers, and tape in accordance with ASTM D 2734-16, where the densities may be determined ASTM D792-17. Of course, the void fraction can also be estimated using conventional microscopy equipment.

After impregnation, the fiber-reinforced polymer composition may have a variety of different forms, such as a tape, sheet, etc. In FIG. 1, for example, the composite structures 14 and 17 may be in the form of a tape. The tape may include a "polymer-rich" portion having a greater volume of the polymer than fibers and a "fiber-rich" portion having a greater volume of fibers than polymer. The "polymer-rich" portion may, for instance, contain about 50% or more, in some embodiments about 70% or more, and in some embodiments, from about 80% to 100% by volume of the polymer matrix, and about 50% or less, in some embodiments about 30% or less, and in some embodiments, from 0% to about 20% by volume of the continuous fibers. Conversely, the "fiber-rich" portion may contain about 50% or more, in some embodiments about 70% or more, and in some embodiments, from about 80% to 100% by volume of the continuous fibers, and about 50% or less, in some embodiments about 30% or less, and in some embodiments, from 0% to about 20% by volume of the polymer matrix. Typically, the polymer-rich portion is located at the outer surface of the tape. For example, when viewed in cross-section, the tape may define an upper outer surface and opposing lower outer surface. An upper region is location adjacent to the upper outer surface, lower region is positioned adjacent to the lower outer surface, and a central region is positioned between the upper and lower regions. In certain embodiments, the central region may be a fiber-rich portion, and the upper and/or lower regions may be polymer-rich portions.

Within the tape or sheet, the continuous fibers are typically unidirectional in that all or substantially all of the fibers are oriented in the substantially the same direction. The particular angular fiber orientation ("orientation angle") of the unidirectional fibers may vary relative to an axis of loading or reference axis may vary. The orientation angle may, for instance, range from about 0° to about 90°, in some embodiments from about 10° C. to about 80°, and in some embodiments, from about 30° to about 60° (e.g., 45°). The ability to orient the continuous fibers in a desired direction is particularly beneficial when the tape or sheet is employed in a composite laminate. Namely, such laminates may contain one or more tapes in which the continuous fibers are oriented in different direction to help provide the desired structural support in areas where it is most needed.

Figure 5:
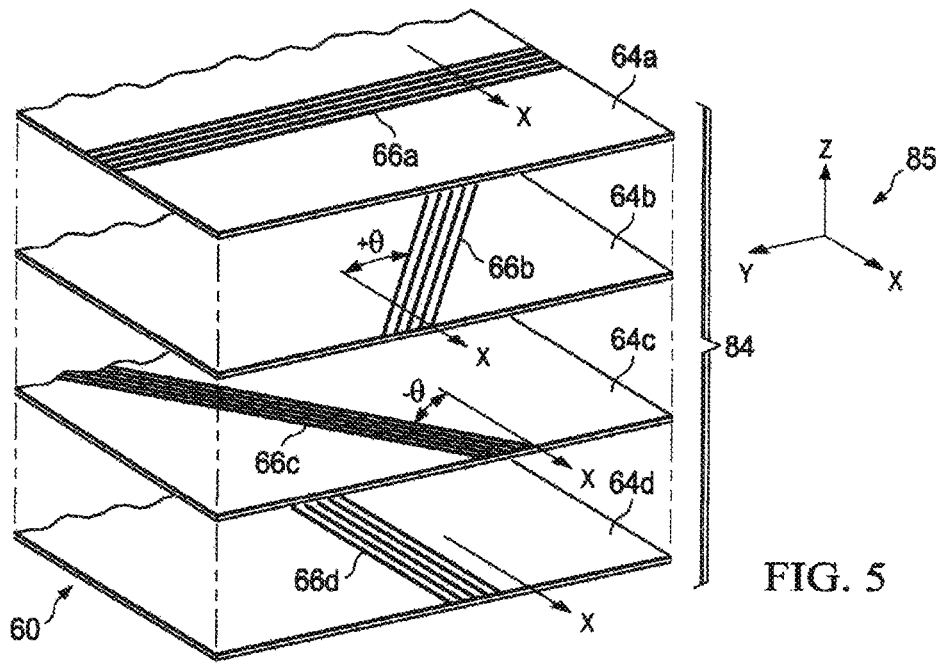
FIG. 5 is an exploded, perspective view of several individual plies of the composite laminate of FIG. 3.

Referring to FIG. 5, for example, one embodiment of such a composite laminate 60 is shown that contains multiple plies 64a-64d of a part layup 84. Each of the plies 64a-64d includes unidirectional continuous fibers 66a-66d having a predetermined angular orientation relative to an axis of loading or reference axis which, in the illustrated embodiment, is indicated as the X axis in an orthogonal coordinate system 85. The plies 64a-64d may each include a unidirectional tape that may be laid up using automated equipment, such as without limitation, manually or by a computer controlled automated fiber placement machine (not shown). The ply 64a includes continuous fibers 66a that have an angular orientation of approximately 90°, while ply 64d includes continuous fibers 66d that have an angular orientation of approximately 0° relative to the X axis. Thus, continuous fibers 66a of ply 64a are generally perpendicular or orthogonal to the X axis while the continuous fibers 66d of ply 64d are generally parallel to the X axis. On the other hand, the ply 64b includes unidirectional continuous fibers 66b having angular fiber orientations ±θ relative to the X axis, while ply 64c includes unidirectional continuous fibers 66c having angular fiber orientations −θ relative to the X axis. The cross-ply angle ±θ may vary, but is typically from about 20° to about 60°, and in some embodiments, from about 30° to about 50° (e.g., 45°). For simplicity of illustration, only four plies 64a-64d are shown in the example of FIG. 5, however, in other embodiments, the part layup 84 may include a number of interspersed sets or groups of the plies 64a-64d respectively having different fiber orientations according to a predetermined ply schedule to achieve the desired part characteristics and performance.

Figure 3:
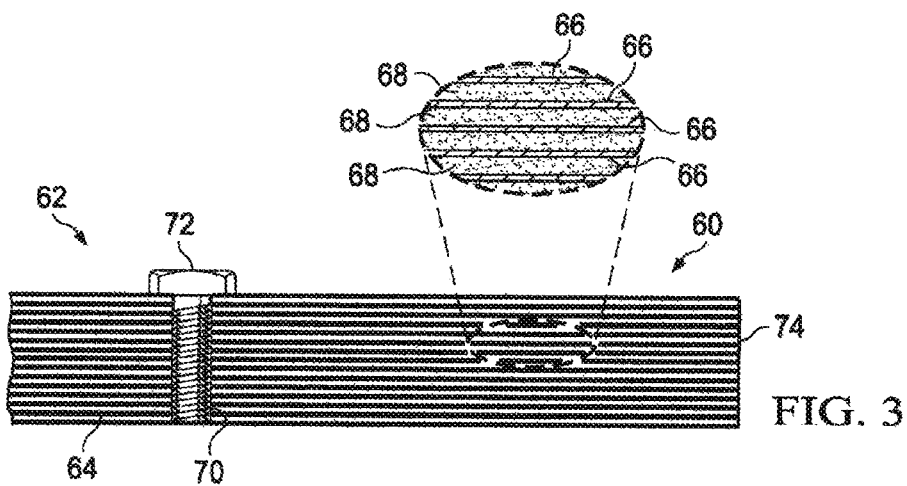
FIG. 3 is a cross-sectional view of one embodiment of a composite laminate having cross-plies that may be formed in accordance with the present invention.
Figure 4:
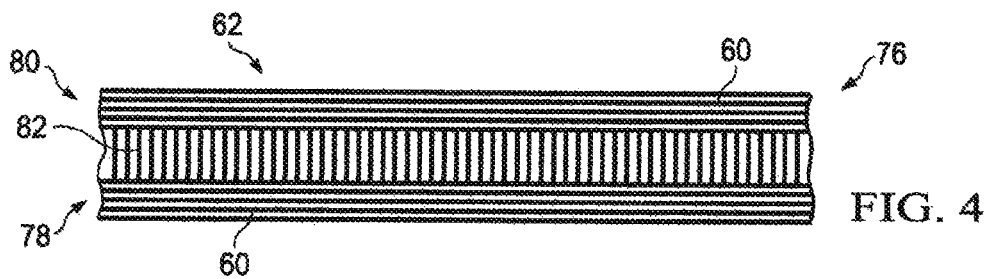
FIG. 4 is a cross-sectional view of the sandwich panel containing the laminate of FIG. 3.

The fiber-reinforced polymer composition, as well as composite laminates such as described above, may be incorporated into a variety of different parts. For example, the composition may be employed in a blade, such as a wing, rotor blade (e.g., wind turbine blade, helicopter blade, fan blades, aircraft propeller, boat propeller, etc.), and so forth. Wind turbines, for instance, generally include a rotor having multiple blades. The rotor is mounted on a housing or nacelle, which is positioned on top of a truss or tubular tower. The blades on these rotors transform wind energy into a rotational torque or force that drives one or more generators, rotationally coupled to the rotor through a gearbox or directly coupled to the rotor. If desired, a portion of the wind turbine blade may contain the fiber-reinforced composition (e.g., tape) or a composite laminate containing the composition. For instance, the blade may be constructed of a core over which a shell is disposed. The core, shell, or both may contain the fiber-reinforced composition (or a composite laminate containing the composition). Referring to FIGS. 3-4, for example, a blade 62 is shown that contains a core 82 positioned between shell layers 78 and 80. In this particular embodiment, the shell layers may be formed from the composite laminate 60, which includes a plurality of laminated plies 64 (e.g., 64a, 64b, 64c, 64d from FIG. 5) containing unidirectional continuous fibers 66 (e.g., 66a, 66b, 66c, 66d from FIG. 5) distributed within a polymer matrix 68. As discussed above, the plies may be placed laterally along the core 82 so that the continuous fibers are oriented in a particular cross-ply angle (e.g., from about 20° to about 60°). If desired, holes 70 may be drilled into the laminate 60 to received fasteners and edges 74 of the laminate 60 may be cut when the part 62 is trimmed.

Of course, besides blades, the fiber-reinforced composition may also be used in other types of parts, such as interior and exterior automotive parts, etc. Suitable exterior automotive parts may include fan shrouds, sunroof systems, door panels, front end modules, side body panels, underbody shields, bumper panels, cladding (e.g., near the rear door license plate), cowls, spray nozzle body, capturing hose assembly, pillar cover, rocker panel, etc. Likewise, suitable interior automotive parts that may be formed from the fiber-reinforced composition of the present invention may include, for instance, pedal modules, instrument panels (e.g., dashboards), arm rests, consoles (e.g., center consoles), seat structures (e.g., backrest of the rear bench or seat covers), interior modules (e.g., trim, body panel, or door module), lift gates, interior organizers, step assists, ash trays, glove boxes, gear shift levers, etc. Other suitable parts may include siding panels, fence picket parts, end caps, joints, hinges, trim boards for interior and exterior decoration, synthetic roofing shingles, slates, shakes or panels, etc.

The present invention may be better understood with reference to the following example.

Test Methods

Deflection Under Load Temperature ("DTUL"): The deflection under load temperature may be determined in accordance with ISO 75:2013 (technically equivalent to ASTM D648-18). A test strip sample having a length of 80 mm, thickness of 10 mm, and width of 4 mm may be subjected to an edgewise three-point bending test. For blended polymer compositions (e.g., tapes), the specified load may be 3.5 Megapascals and the span may be 64 mm in accordance with ISO 75-3:2013. For neat polymers, the specified load may be 1.8 Megapascals in accordance with ISO 75-2:2013. The specimens may be lowered into a silicone oil bath where the temperature is raised at 2° C. per minute until it deflects the desired distance, such as 0.25 mm or 0.32 mm.

Tensile Modulus, Tensile Stress, and Tensile Elongation at Break Tensile properties may be tested according to ASTM D039-17. The testing temperature may be −30° C., 23° C., or 80° C. and the testing speeds may be 1 or 5 mm/min.

Flexural Modulus, Flexural Elongation at Break, and Flexural Stress: Flexural properties may be tested according to ISO Test No. 178:2010 (technically equivalent to ASTM D790-15e2). This test may be performed on a 40:1 span-to-thickness ratio. Tests may be run on specimens machined from multi-layered compression molded panels. The testing temperature may be −30° C., 23° C., or 80° C. and the testing speed may be 3-5 mm/min.

Example

Polymer matrix samples are formed from a resin blend (e.g., about 94 wt. %), phosphite stabilization package to prevent transesterification and provide heat stability (e.g., about 7 wt. %), and a coupling agent (e.g., about 1 wt. %). The resin blend is formed from various combinations of a polyethylene terephthalate ("PET") and polycarbonate ("PC") as set forth in the table below. The PET has a MW of 192 g/mol, glass transition temperature of 78° C., melting point of 255° C., and a DTUL of 63° C. at 1.8 MPa. The PC has a molecular weight of 266 g/mol, glass transition temperature of 145° C., melt volume flow rate of 17 cm$^3$/10 min at 250° C./2.16 kg, and DTUL of 124° C. at 1.8 MPa.

| Sample | PET (wt. %) | PC (wt. %) | $T_G$ [° C.] | Wt. % |
|---|---|---|---|---|
| 1 | 0 | 100 | 78 | 0 |
| 2 | 20 | 80 | 85 | 20 |
| 3 | 30 | 70 | 90 | 30 |
| 4 | 47.5 | 63.5 | 100 | 47.5 |
| 5 | 62.5 | 37.5 | 110 | 62.5 |
| 6 | 80 | 20 | 125 | 80 |
| 7 | 100 | 0 | 148 | 100 |

The resin blends of Samples 1-7 are produced on a high shearing twin-screw extruder that enables thorough mixing and dispersion of the blends. Once formed, the resulting polymer matrices are used to produce composite tapes by pulling continuous glass fiber rovings through a pre-heater/tensioning system to spread the fiber out prior to impregnation. Spreading and heating the fiber tows promotes wetting of the fiber by the molten polymer. Once the fiber is spread and heated, it is pulled into the cross-head die where the fiber is impregnated by the polymer. This is accomplished by ensuring each tow of fiber has the same amount of resin and through features in the die as described herein that mechanically force the resin into the fiber bundles. Once impregnated, the fiber is pulled from the die and into tooling that helps control dimensions and then into the tape forming portion of the process. The fully formed tape is then wound into spools of a predetermined weight and/or length. The tape may, for instance, contain 60 wt. % of the glass fiber rovings and 40 wt. % of the polymer matrix.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A tape comprising a fiber-reinforced polymer composition comprising a plurality of continuous fibers embedded and distributed within a thermoplastic polymer matrix, wherein the thermoplastic polymer matrix constitutes from about 20 wt. % to about 90 wt. % of the composition and the continuous fibers constitute from about 10 wt. % to about 80 wt. % of the composition, wherein the polymer composition has a deflection temperature under load of about 60° C. or more as determined in accordance with ISO 75:2013 at a load of 3.5 MPa, wherein the tape has an upper outer surface and an opposing lower outer surface, and further wherein an upper region is defined adjacent to the upper outer surface, a lower region is defined adjacent to the lower outer surface, and a central region is defined between the upper region and the lower region, wherein the central region is fiber-rich and the upper and/or lower regions are polymer-rich.

2. The tape of claim 1, wherein the polymer matrix includes an aromatic polyester.

3. The tape of claim 2, wherein the aromatic polyester includes poly(ethylene terephthalate), poly(1,4-butylene terephthalate), poly(1,3-propylene terephthalate), poly(1,4-butylene 2,6-naphthalate), poly(ethylene 2,6-naphthalate), poly(1,4-cyclohexylene dimethylene terephthalate), or a copolymer, derivative, or mixture thereof.

4. The tape of claim 2, wherein the aromatic polyester includes poly(ethylene terephthalate) or a derivative thereof.

5. The tape of claim 2, wherein the aromatic polyester has an intrinsic viscosity of from about 0.1 dl/g to about 6 dl/g as determined in accordance with ISO 1628-5:1998.

6. The tape of claim 2, wherein the aromatic polyester has a glass transition temperature of from about 30° C. to about 120° C. as determined by ISO 11357-2:2013 and/or a Vicat softening temperature of from about 40° C. to about 150° C. as determined in accordance with ISO 306:2004.

7. The tape of claim 2, wherein the aromatic polyester has a deflection temperature under load of from about 20° C. to about 80° C. as determined in accordance with ISO 75:2013 at a load of 1.8 MPa.

8. The tape of claim 1, wherein the polymer matrix contains an additional polymer.

9. The tape of claim 8, wherein the additional polymer has a deflection temperature under load of about 80° C. to about 300° C. as determined in accordance with ISO 75:2013 at a load of 1.8 MPa.

10. The tape of claim 8, wherein the additional polymer has a melt volume rate of about 2 cm³/10 min or more as determined at a temperature of 250° C. and load of 2.16 kg in accordance with ISO 1133:2011.

11. The tape of claim 8, wherein the additional polymer is an aromatic polycarbonate.

12. The tape of claim 11, wherein the aromatic polycarbonate has an intrinsic viscosity of from about 0.1 dl/g to about 6 dl/g as determined in accordance with ISO 1628-4:1998.

13. The tape of claim 11, wherein the aromatic polycarbonate has a glass transition temperature of from about 50° C. to about 250° C. as determined by ISO 11357-2:2013 and/or a Vicat softening temperature of from about 50° C. to about 250° C. as determined in accordance with ISO 306:2004.

14. The tape of claim 8, wherein aromatic polyesters constitute from about 40 wt. % to about 99 wt. % of the polymer matrix and the additional polymers constitute from about 1 wt. % to about 60 wt. % of the polymer matrix.

15. The tape of claim 1, wherein the polymer matrix further comprises a coupling agent, flow modifier, pigment, antioxidant, stabilizer, filler, antistatic agent, surfactant, wax, flame retardant, additional polymer, or a combination thereof.

16. The tape of claim 15, wherein the coupling agent includes a polyolefin that is modified with a polar functional group.

17. The tape of claim 1, wherein the continuous fibers include glass fibers, carbon fibers, or a combination thereof.

18. The tape of claim 1, wherein the continuous fibers are contained in rovings.

19. The tape of claim 1, wherein the continuous fibers are unidirectional.

20. The tape of claim 18, wherein the continuous fibers are oriented at an angle relative to an axis of loading that ranges from about 30° to about 60°.

21. A composite laminate comprising multiple plies, wherein at least one of the plies contains the tape of claim 1.

22. A blade comprising the composite laminate of claim 21.

23. The blade of claim 22, wherein the blade is a rotor blade.

* * * * *